US010169691B2

(12) United States Patent
Lawandy

(10) Patent No.: US 10,169,691 B2
(45) Date of Patent: Jan. 1, 2019

(54) COVERT COATING FOR AUTHENTICATION OF MATERIALS

(71) Applicant: Nabil Lawandy, Saunderstown, RI (US)

(72) Inventor: Nabil Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 104 days.

(21) Appl. No.: 13/743,442

(22) Filed: Jan. 17, 2013

(65) Prior Publication Data
US 2014/0197241 A1     Jul. 17, 2014

(51) Int. Cl.
B42D 25/378 (2014.01)
G06K 19/06 (2006.01)
B42D 25/29 (2014.01)
G07D 7/1205 (2016.01)

(52) U.S. Cl.
CPC ......... G06K 19/0614 (2013.01); B42D 25/29 (2014.10); B42D 25/378 (2014.10); G06K 19/06028 (2013.01); G07D 7/1205 (2017.05); B42D 2035/34 (2013.01)

(58) Field of Classification Search
USPC .......................................................... 235/488
See application file for complete search history.

(56) References Cited

U.S. PATENT DOCUMENTS 5,702,511 A     12/1997 de Saint-Romain et al.
7,038,766 B2 *  5/2006 Kerns .................... A63B 45/02
                                                                356/71
7,153,557 B2 * 12/2006 Rancien ................ G09F 3/0292
                                                                428/40.2
8,110,281 B2    2/2012 Downing
2004/0119057 A1* 6/2004 Lawandy ................. B07C 3/18
                                                                252/583
2006/0237541 A1* 10/2006 Downing ............... G07D 7/005
                                                                235/462.01
2007/0077661 A1* 4/2007 Lucht ...................... C08L 65/00
                                                                436/172
2007/0210572 A1* 9/2007 Halbrook ................ A63F 3/065
                                                                283/62
2010/0214373 A1* 8/2010 Carr ....................... B41M 3/142
                                                                347/73
2011/0209328 A1* 9/2011 Steenblik ............... B42D 25/29
                                                                29/428

(Continued)

FOREIGN PATENT DOCUMENTS

EP          0327788 B1    11/1993

Primary Examiner — Michael G Lee
Assistant Examiner — David Tardif
(74) Attorney, Agent, or Firm — Barlow, Josephs & Holmes, Ltd.

(57) ABSTRACT

Systems and methods for document and product authentication are provided using a combination of interacting absorption and emission materials that are formed into covert optically encoded markings. The markings are formed from at least one emitter and at least one absorber, that exhibit a first emission in response to a first excitation of the emitter and a change in that emission in response to excitation of the absorber such that various combinations of emitter and absorber materials create a machine readable response that cannot be detected by the human eye.

16 Claims, 4 Drawing Sheets

(56) References Cited

U.S. PATENT DOCUMENTS

2013/0088603 A1* 4/2013 Pawlik ..................... H04N 5/33
                                                                        348/164
2013/0222904 A1* 8/2013 Kurtz ....................... G03C 9/06
                                                                        359/463
2014/0098156 A1* 4/2014 Taff ...................... B41J 2/04561
                                                                         347/19

* cited by examiner

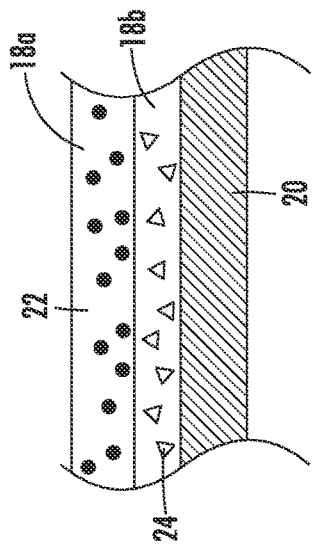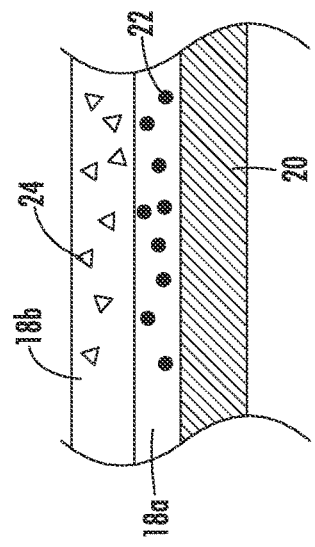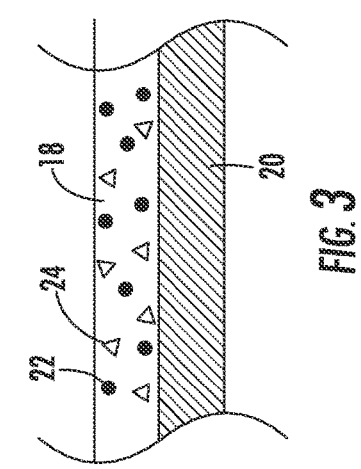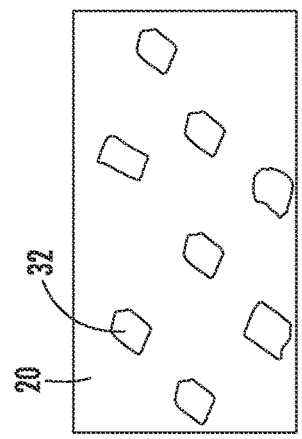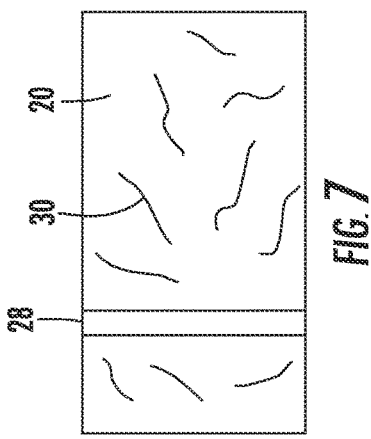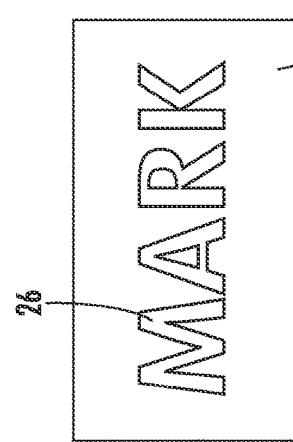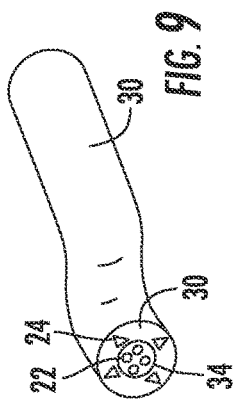

COVERT COATING FOR AUTHENTICATION OF MATERIALS

BACKGROUND OF THE INVENTION

The present invention relates generally to detectable security markings. More specifically, the present invention relates to optically encoded markings, formed from at least one emitter and at least one absorber, that exhibit a first emission in response to a first excitation of the emitter and a change in that emission in response to excitation of the absorber such that various combinations of emitter and absorber materials create a machine readable response that cannot be detected by the human eye.

Counterfeiting and forgery have become significant concerns in the modern economy and marketplace. While fraudulent activities such as counterfeiting currency and forging signatures or handwriting are common, methods of creating and perfecting forgeries and counterfeit documents have become easier and more available with the advent of highly skilled computer printing and processing. Given the advances and reduction in cost of computing technology and printing techniques, the incidence of forgeries, counterfeited documents, and other fraudulent activities have increased. This is problematic in that countless areas of today's high-technology society require and rely upon certification, authentication and protection of highly valuable documents, papers, currency or other materials in order to prevent fraud and counterfeiting.

A similar problem exists in a variety of contexts. In addition to protecting against counterfeit currency, authentication of valuable documents or materials also affects many facets of the economy. Authentication stamps such as visas or postmarks, for example are subject to fraudulent use and forgery. Also a wide variety of products and consumer goods may be created as knock-offs cheap replacements or gray market goods. Notaries public use a raised stamp to authenticate notarized documents. Drivers' licenses, passports and other photographic identification contain holograms and microprinting. Sporting memorabilia and retail clothiers use holographic tags and stamps to assist in proving authenticity. Even fashion designers are now including authentication devices in their clothing to prevent passing off of knock-offs as designer products.

A disadvantage to most of the traditional security features is that they are visible and known to the world. If a counterfeiter is aware there is a security thread in a bill or a watermark in a document, replication of the security feature is easier. Once a feature is made known to the public, a counterfeiter may begin to develop specific strategies and solutions to overcome the security protections provided by the specific feature.

As a result, for ensuring authenticity to certain documents, specific inks have been developed. These inks incorporate colorless products, i.e. invisible to the naked eye in visible light, but which can be observed by illuminating them with a light having a particular wavelength, such as ultraviolet, which gives rise to fluorescence or phosphorescence of the ink in turn making them visible, or by making them react with other products rendering them visible to the naked eye. Typically, as the exposure to the particular light (UV) stops and after a very short time, the ink reassumes its initial, invisible appearance. The type of compound responsible for this phenomenon absorbs light at a certain wavelength and reemits it at a higher wavelength for the exposure time.

More recently, products that change absorption spectrum under the effect of light have appeared. These products are called photochromic inks. Generally, said photochromic inks are invisible under normal illumination conditions and become visible, i.e. having e.g. a blue or green color, following illumination under ultraviolet light. Thus, for example, a document on which inscriptions are made with blue or green ink on a background covered by a photochromic ink cannot be photocopied. Thus, when the document is exposed to the radiation of the photocopier, the background of the document is tinted blue or green and the inscriptions made with normal ink can no longer be distinguished from the background. Similarly, thermochromic inks are used as authentication marks. Like photochromic inks, thermochromic inks are invisible under normal conditions and become visible, i.e. having e.g. a blue or green color, when a heat source is applied. The difficulty in the use of these materials is that they operate only to change an absorption response. Since the changes are intended to be very subtle and not visually detectable, this creates the need to introduce probes that create an illumination at the spectral band of interest in order to determine if the absorption change is occurring.

The difficulty of all of these technologies is that their responses are limited and once their function and placement is known a counterfeiter can replicate them without great difficulty.

Accordingly, there is a need for covert optically encoded markings, formed from at least one emitter and at least one absorber, that exhibit a first emission in response to a first excitation of the emitter and a change in that emission in response to excitation of the absorber such that various combinations of emitter and absorber materials create a machine readable response that cannot be detected by the human eye.

BRIEF SUMMARY OF THE INVENTION

In this regard, the present invention provides embodiments of systems and methods for document and product authentication using optically encoded markings, formed from at least one emitter and at least one absorber, that exhibit a first emission in response to a first excitation of the emitter and a change in that emission in response to excitation of the absorber, such that various combinations of emitter and absorber materials create a machine readable response that cannot be detected by the human eye. The encoded markings are provided in the form of visible or invisible coatings that exhibit one or more excited emissive and/or absorptive responses that exhibit cumulative changes in emissive response that are machine detectable.

The various embodiments of the present invention are used for authentication and protection of items, including secure documents including banknotes, ID documents, Visas, and tax stamps as well as various consumer products.

In a first embodiment, the system is comprised of at least one emitter that creates an emission in response to a first stimulation and at least one absorber that causes a change in the emission based upon application of a second stimulation. The change in emission is the result of the change in the absorption characteristic of the second material upon excitation. The emission in the scope of the present invention can be fluorescence, phosphorescence or up conversion, while the absorption change material can be photochromic, thermochromic, electrochromic, magnetochromic and/or mechanochromic. Further, the present invention may use combinations of any of the above.

Embodiments of the invention include coatings wherein the emitter and absorber are comingled. Additional embodiments may include coating layers wherein the emitter is in a first coating and the absorber is in a second coating. Still further embodiments provide for inks, security threads, planchettes and/or fibers formed in accordance with the disclosure herein. Still further embodiments of the present invention include encoded images printed using alternating bands of emitter and emitter/absorber coating to create a machine readable code.

It is therefore an object of the present invention to provide covert optically encoded markings, formed from at least one emitter and at least one absorber, that exhibit a first emission in response to a first excitation of the emitter and a change in that emission in response to excitation of the absorber such that various combinations of emitter and absorber materials create a machine readable response that cannot be detected by the human eye.

It is still a further object of the present invention to provide a machine and method for exciting the coating materials of the present invention and then measuring and comparing the absorption or emission signatures of the materials in order to verify authenticity of a coated product.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIGS. 3-5 depict various arrangements of layers containing emitters and/or absorbers in accordance with the present invention;

FIG. 6 depicts a security feature formed of ink;

FIG. 7 depicts security thread and fiber security features;

FIG. 8 depicts planchette security features;

FIG. 9 depicts a cross-sectional view of a fiber security feature; and

DETAILED DESCRIPTION OF THE INVENTION

The invention will be more completely understood through the following detailed description, which should be read in conjunction with the attached drawings. While detailed embodiments of the invention are disclosed herein, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

Most generally, the present invention provides embodiments of systems and methods for document and product authentication using optically encoded markings, formed from at least one emitter and at least one absorber, that exhibit a first emission in response to a first excitation of the emitter and a change in that emission in response to excitation of the absorber, such that various combinations of emitter and absorber materials create a machine readable response that cannot be detected by the human eye. The encoded markings are provided in the form of visible or invisible coatings that exhibit one or more excited emissive and/or absorptive responses that exhibit cumulative changes in emissive response that are machine detectable.

The disclosed authentication system is intended for authentication of products that include a substrate that has been coated or embedded with the materials of the present invention, including secure documents such as banknotes, ID documents, Visas, and tax stamps. The technology can also be used to authenticate a variety of different consumer products and consumable goods that are used in connection with appliances and the like. Alternately, the security feature may be constructed as a planchette, security thread or a planchette for addition to substrates such as for example, paper.

Figure 1:
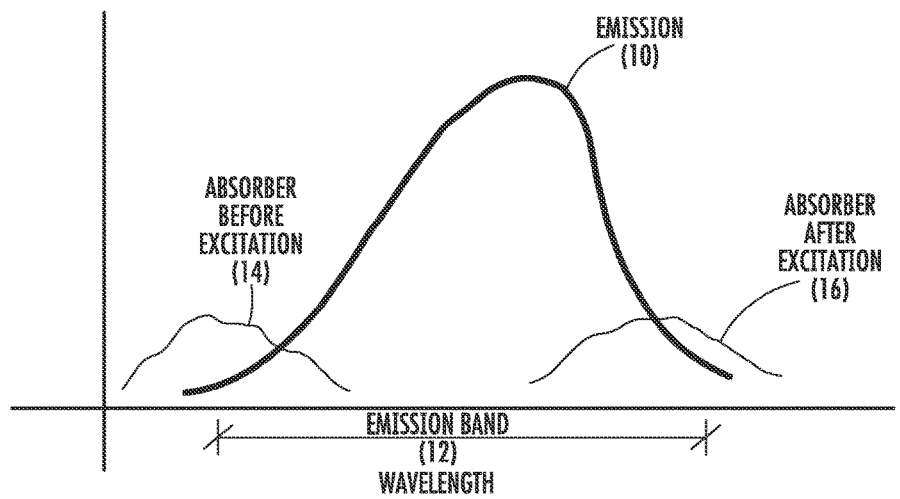
FIG. 1 is an illustrative graph of the response of the emitter and absorber materials in accordance with the present invention.

As can best be seen at FIG. 1, the present invention includes a security feature for authenticating an article comprising, at least one emitter material that generates an emission 10 within an emission band 12 in response to a first excitation and least one absorber material that undergoes a change from a first absorption characteristic 14 to a second absorption characteristic 16 within at least a portion of the emission band 12 of the emitter material in response to a second excitation. As a result, the change in the absorption characteristics causes a non-apparent change in the emission. In other words, in response to a first stimulation, the emitter material generates an emission, as a second stimulation is applied, the absorber undergoes a change that shifts its absorption characteristics relative to the emission band resulting in a nonvisible change in the emission band. This nonvisible change representing a 5% or less shift in the emission level however is machine detectable to allow a detector to verify the authenticity of the security feature. This is particularly advantageous as compared to the prior art in that the resultant response is a change in emission and not simply absorption thus eliminating the need for the probes to locate whether a change is in fact occurring.

Figure 2:
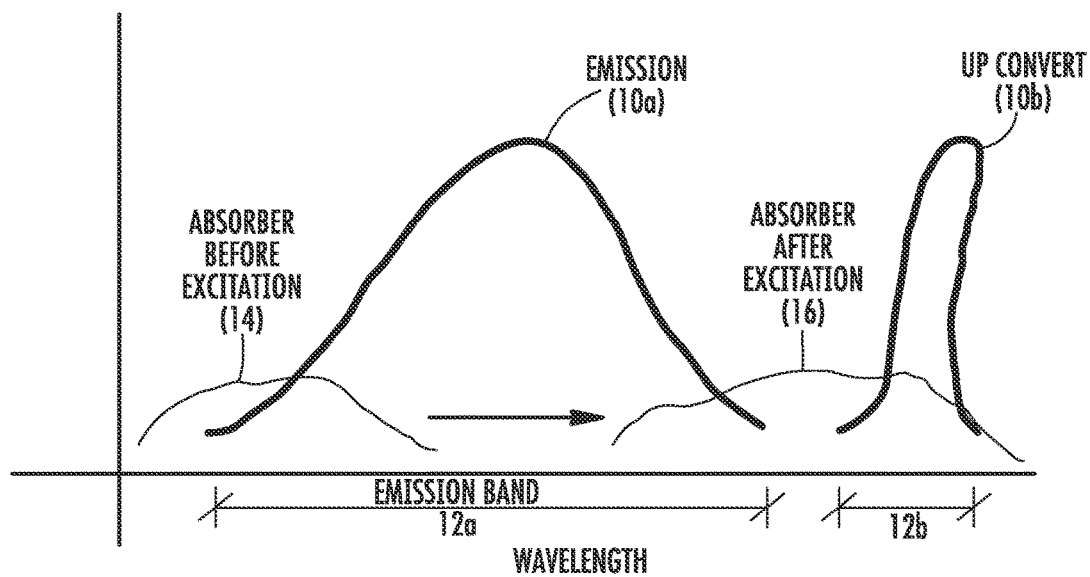
FIG. 2 is an illustrative graph of the response of the emitter and absorber materials in accordance with an alternate arrangement of the present invention.

It is preferred that the at least one emitter within the present invention is selected from the group consisting of: fluorescent materials, phosphorescent materials, up-conversion materials and combinations thereof. In this regard, the first excitation would be an excitation consisting of the application of energy of the type, wavelength and amplitude sufficient to cause said emitter material to generate an emission. Similarly, the at least one emitter may include more than one emitters as depicted at FIG. 2 wherein a first fluorescent emitter 10a and an up conversion emitter 10b create respective emission responses when ultraviolet energy and a 980 nm pump diode are applied. These emitters create emissions in their respective emission bands 12a and 12b. As can be seen the absorber undergoes a change from a non-excited state 14 to an excited state 16 relative to the emission bands 12a and 12b of the emitters 10a and 10b resulting in a nonvisible emission change.

One skilled in the art should appreciate that the machine readable change being detected may be a detection of the emission across the entire emission band in its aggregate or at one or more narrower preselected points of the emission band.

It is further preferred that the at least one absorber is selected from the group consisting of: photochromic materials, thermochromic materials, electrochromic materials, magnetochromic materials, mechanochromic materials and combinations thereof. Excitation of the above materials is achieved by applying energy of the appropriate type so as to induce the change in the absorber material. It is within the scope of the present invention that the first stimulation energy appropriate to create an emission is different in type and/or amplitude from the second stimulation energy appropriate to induce a change in the absorber. Further, however, it is possible that the first and second stimulation energies are of the same type and vary instead only in amplitude. It should also be appreciated by one skilled in the art that while the figures herein depict an absorber that serves to decrease the emission after the change is induced, there are some materials in the absorber category that will in fact undergo a change that results in a reduction in their absorption characteristics when energized. As a result, such materials would then cause a nonvisible change in the form of an increase in the emission level.

In one embodiment as depicted at FIG. 3, the security feature is formed as a coating 18 on a substrate 20. The coating 18 is formed to include both the emitter material 22 and the absorber material 24 in a single coating. Alternately, as depicted at FIG. 4, the security feature is applied in two overlying coatings, a first coating 18a containing the emitter material 22 overlying the substrate 20 and a second coating 18b containing the absorber material 24 applied over the first coating 18a. Still further, at FIG. 5, should a substrate 20a have sufficient reflectivity, then the coating 18b containing the absorber material 24 can be positioned adjacent the substrate 20a with the coating 18b containing the emitter material 22 positioned thereon.

It is further within the scope of the present invention to provide a coating wherein one or more emitter materials are combined with one or more absorber materials form a change that creates a covert, machine detectable signature when appropriately excited using the right combination and level of energy stimuli.

In one embodiment, the authentication process includes detecting a time required for the absorber material to relax to its original state after the application if excitation energy is terminated. Since the relaxation time for these materials is dependent on both the material as well as the carrier in which the material is embedded, timing of relaxation provides for authentication of the carrier and relative composition compounding percentages as well.

In one illustrative embodiment of the present invention at FIG. 6, a substrate 20 is coated with the emitter and absorber materials described above in the form of an ink or dye 26. The ink or dye 26 coating contains an emitter material that is embedded with one or more absorber materials. Further, the ink or dye 26 may be used to form indicia. When first excitation energy is applied the ink or dye 26 creates an emission and at a second excitation the absorber causes a change in the overall emission to yield verification as to the presence or lack of the authentic coating.

At FIG. 7 the security feature can be seen as a security thread 28 or fibers 30 within the substrate 20. In the case of the fibers 30 or security threads 28, the entire cross section may be a composition containing both the emitter and absorber. Alternately, as seen in FIG. 9, the fiber 30 may have a core 34 and a sheath 36 such that the core 34 contains preferably the emitter material 22 and the sheath 36 contains preferably the absorber materials 24.

In FIG. 8 it can be seen that a substrate 20 may have planchettes 32 therein such that the planchettes 32 are formed to respond in accordance with the present invention. In the case of planchettes 32 the planchette is coated as described above relating to coated substrates or formed to include the emitter and absorber materials integrally therein.

Figure 10:
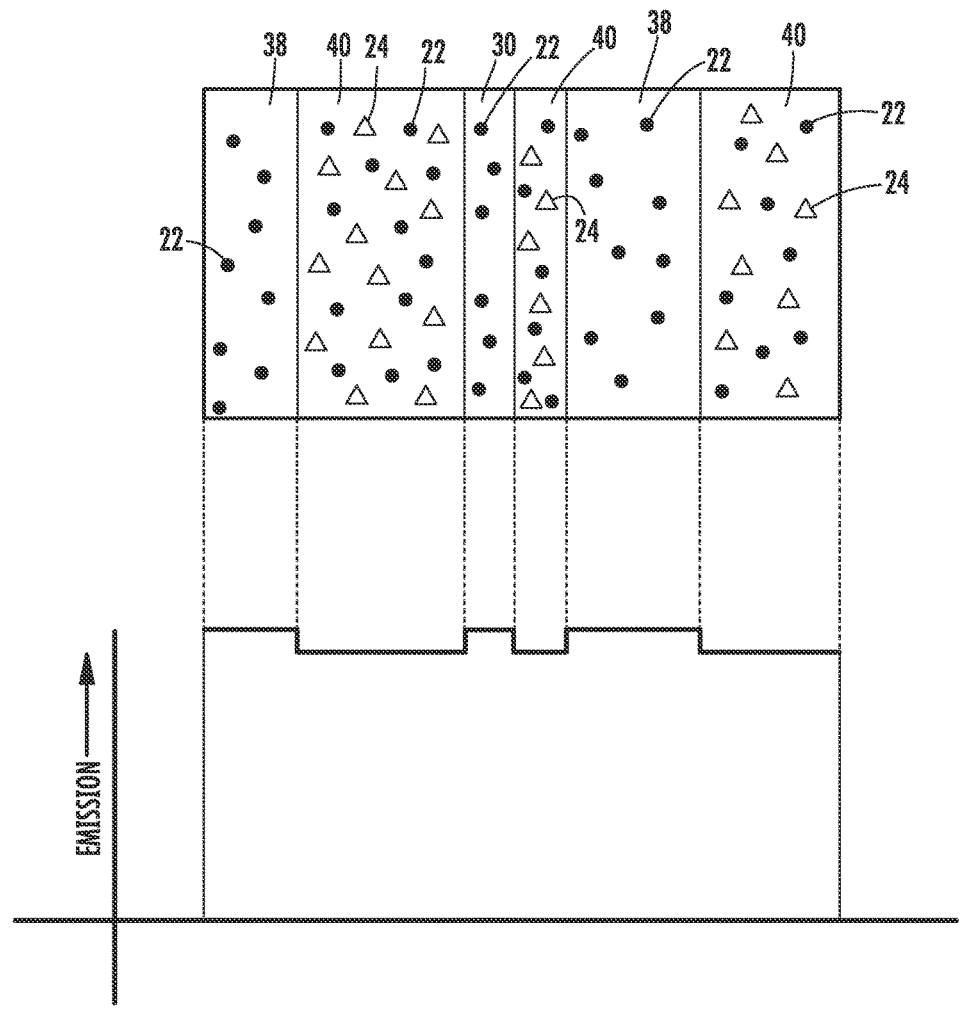
FIG. 10 depicts a graphic code security feature in accordance with the present invention.

In yet another embodiment, as seen at FIG. 10, the present invention may be in the form of a graphic feature or code that is created using alternating bands of a coating 38 containing the emitter material 22 and a coating 40 containing both the emitter 22 and absorber 24 materials. When excitation energy is applied the entire surface and alternating bands appear to be a single solid, uninterrupted feature. However as can be seen below, the actual emission of the coating bands results in high and low emission levels as detected along the length of the substrate. While this coating visually appears to be monolithic, when scanned using a machine an encoded barcode appears that is actually made up of slightly brighter and darker lines in a pattern not visible to the eye.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed:

1. A security feature for authenticating an article comprising:
    at least one emitter material that generates a visible broad range emission within an emission band in response to a first excitation; and
    at least one absorber material that upon exposure to said first excitation absorbs a non-visibly detectable portion of said broad range emission and upon exposure to a second excitation within said emission band and at a wavelength different than said first excitation absorbs a different non-visibly detectable portion of said broad range emission creating a non-visibly detectable spectral response shift in said broad emission range,
    wherein said non-visibly detectable shift in spectral response is a machine detectable shift in a spectral characteristic of said emission.

2. The security feature of claim 1, further comprising:
    said emitter and said absorber disposed within a coating on a substrate.

3. The security feature of claim 1, further comprising:
    said emitter material in a first coating on a substrate; and
    said absorber material in a second coating on said substrate.

4. The security feature of claim 1, wherein said non-apparent change is a machine detectable change in said emission of 5% or less.

5. The security feature of claim 1, wherein said at least one emitter is selected from the group consisting of: fluorescent materials, phosphorescent materials, up-conversion materials and combinations thereof.

6. The security feature of claim 1, wherein said at least one absorber is selected from the group consisting of: photochromic materials, thermochromic materials, electrochromic materials, magnetochromic materials, mechanochromic materials and combinations thereof.

7. The security feature of claim 1, wherein said security feature is a planchette.

8. The security feature of claim 7, wherein said planchette is incorporated into a substrate material.

9. The security feature of claim 1, wherein said security feature is a security thread.

10. The security feature of claim 9, wherein said security thread is incorporated into a substrate material.

11. The security feature of claim 1, wherein said security feature is a fiber.

12. The security feature of claim 11, wherein said fiber has a core containing said emitter material and a sheath surrounding said core containing said absorber material.

13. The security feature of claim 1, wherein said security feature is an arrangement of materials on or in a substrate.

14. The security feature of claim 13, wherein said arrangement is an arrangement of coating strips containing said emitter material on a substrate, a portion of said strips further including said absorber material.

15. The security feature of claim 14, wherein said arrangement, when excited visually appears as a solid graphic, said absorbers creating a machine detectable pattern within the solid graphic.

16. The security feature of claim 15, wherein said detectable pattern is a bar code.

* * * * *